Jan. 22, 1946.　　　　M. H. STORCH　　　　2,393,486
ART OF FABRICATING ARTICLES OF DECORATIVE PLASTIC ELEMENTS
Filed Jan. 5, 1944　　　2 Sheets-Sheet 1
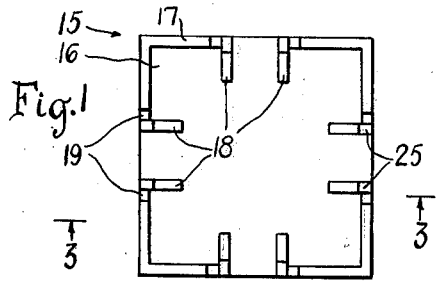
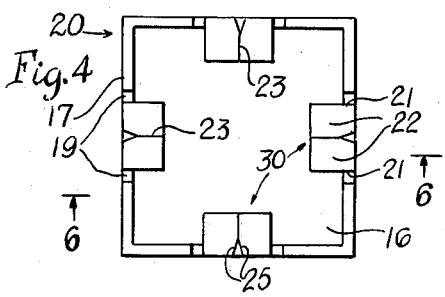
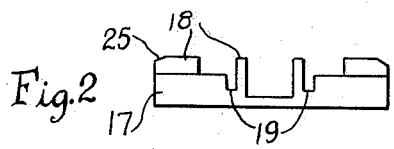
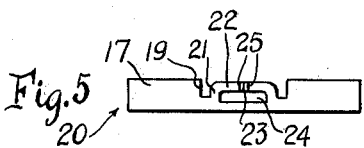
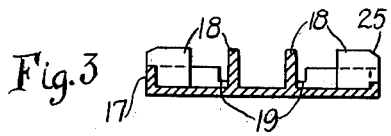
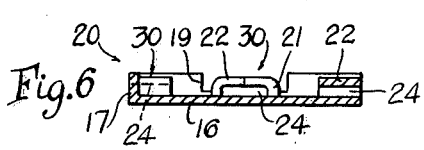
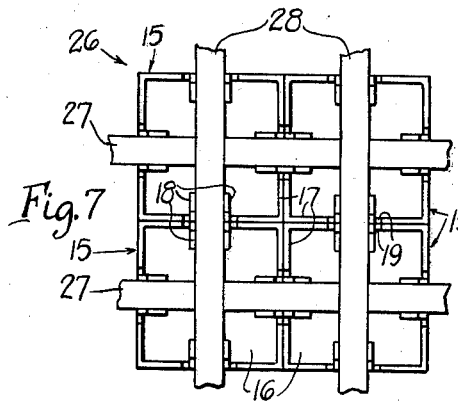
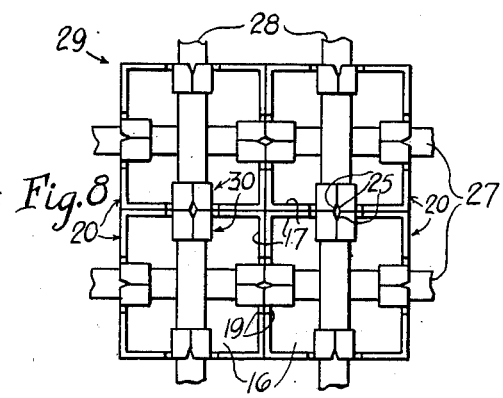
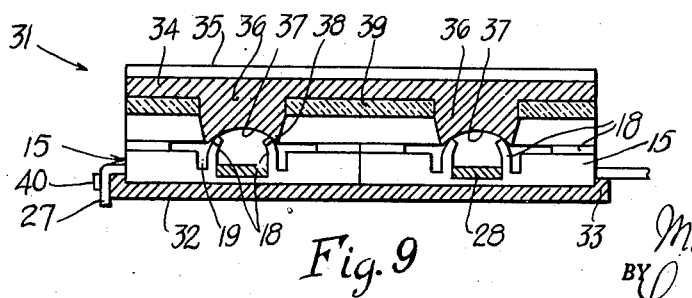
INVENTOR.
Max H. Storch
BY James Shumacher, Atty.

Jan. 22, 1946.     M. H. STORCH     2,393,486
ART OF FABRICATING ARTICLES OF DECORATIVE PLASTIC ELEMENTS
Filed Jan. 5, 1944     2 Sheets-Sheet 2
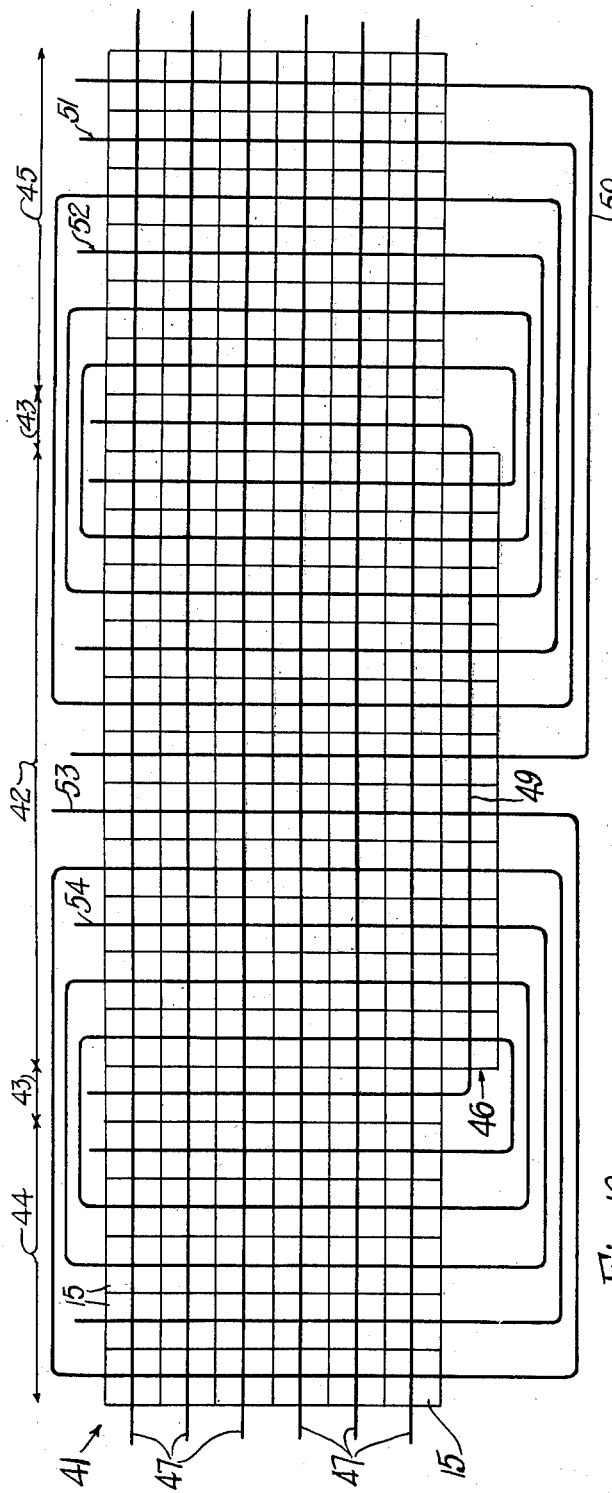
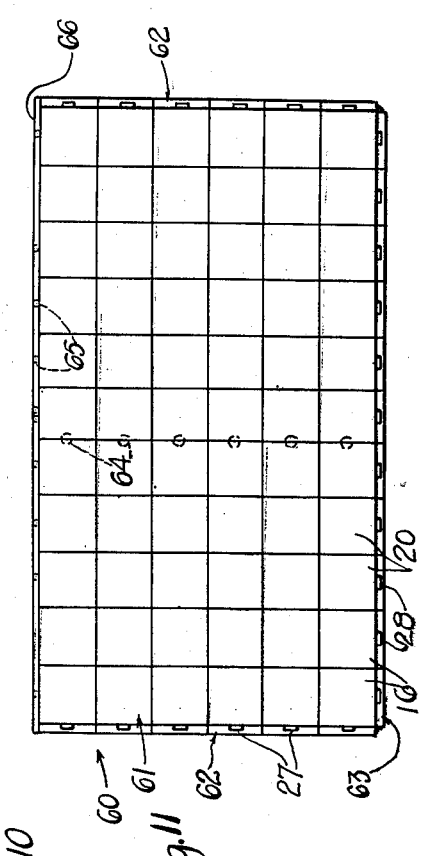
Fig.10
Fig.11
INVENTOR.
Max H. Storch
BY
Louis Shumacher, Atty.

Patented Jan. 22, 1946

2,393,486

UNITED STATES PATENT OFFICE 2,393,486

ART OF FABRICATING ARTICLES OF DECORATIVE PLASTIC ELEMENTS

Max H. Storch, Belle Harbor, Long Island, N. Y.

Application January 5, 1944, Serial No. 517,286

2 Claims. (Cl. 41—10)

This invention relates to improvements in the art of producing articles such as wall structures and handbags wherein relatively rigid plastic ornaments are disposed in side by side contact with each other to produce the walls, with the ornaments being interconnected in a highly flexible manner.

Heretofore such walls or handbags have been produced in the manner exemplified, for instance, by Patent No. 2,256,645 issued September 23, 1941, for Decorative material. The practice, prior to this invention, was to separately mold the decorative elements, and then to string the same on cords or tapes. Each decorative element was anchored in place by two tapes, each tape passing through two closely fitting holes in the element. Hence a multitude of threading operations was required, since each wall was composed of many of these elements for ornamental reasons and also for flexibility. A good handbag requires a high degree of flexibility, and since the decorative elements are rigid, this has always presented a problem, since such handbags are not provided with gussets, and because the elements must be disposed closely side by side to completely conceal the lining, and preferably also the tapes.

Accordingly, the present invention affords an improvement in the art whereby the decorative, rigid elements are secured to the tapes without the necessity of a multitude of threading operations.

Preferably, the decorative elements are secured to the tapes so as to be slidable therealong within narrow limits sufficient to add materially to the flexibility of the wall structure. In certain cases, the slidability of the elements along their tapes is also utilized to facilitate the fabrication of the handbag by loosening or tightening the tapes when they are being interconnected at their ends or secured to adjacent structure.

It is, therefore, another object of the invention to provide an improvement in the art which shall permit the retention of these advantages while causing an arranged field of the preformed decorative elements to be connected en masse to a tape net work in a single operation that saves time and labor and assures uniformity throughout.

While the early practice in handbags of the general type herein referred to has been to expose the tapes in part and to attempt, of necessity, to utilize the tapes as an ornamental feature, the present tendency is to cover and conceal the tapes, first because they are merely structural matter, and second because they tend to soil and wear and detract from the all-plastic appearance of the handbag. Such concealment of the tapes created another difficulty, namely, the holes for stringing the tapes could not be molded without undue expense in the marginal flanges that lie at right angles to the bodies of the elements. In fact, the practice was to punch such holes which caused considerable breakage of the flanges, and in any case, unduly weakened the same. It was not considered feasible to use a complex mold for forming these holes. Considerations of cost require the gang molding of the elements in a simple mold.

It is, therefore, an object of the invention to avoid these difficulties and to provide an improvement in the art whereby openings for slidably receiving the tapes are provided in decorative elements produced by gang molding in a simple mold, and in which the additional advantage is obtained that stringing on the tapes is avoided.

In all cases where the holes for stringing the tapes were formed by molding, not only were the tapes exposed, as already stated, but these holes had to be spaced inward of the edges or flanges of the decorative elements. Only where the holes were struck out in the flanges could the flexible tapes be concealed to secure the elements at their very edges to prevent an edge of one element from rising or protruding with rspect to an edge of an adjoining element, resulting in an uneven or somewhat broken surface.

It is, therefore, another object of the invention to provide an improvement in the art whereby the holes for the flexible tapes can be located at the flanges and the tapes concealed by a structure which can be made in a simple, inexpensive manner.

Still another object of the invention is to furnish an improvement in the art whereby handbags having a bottom wall can be assembled by tapes which need be merely pulled or tensioned to draw the bottom wall into assembled position coincident with the bringing together of side wall portions to provide a continuous wall, so that the tapes need be tied or anchored at a minimum number of points to maintain the handbag assembled.

The invention provides improved structures and methods for avoiding the difficulties and attaining the advantages and objects noted.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawings, wherein like parts are designated by the same reference characters throughout the several views.

In the drawings:

Figure 1 is a bottom plan view of a decorative element embodying the invention.

Fig. 2 is an edge view thereof.

Fig. 3 is a sectional view on the broken line 3—3 of Fig. 1.

Fig. 4 is a bottom plan view of the element as changed by heat and pressure to provide tape holding openings.

Fig. 5 is an edge view thereof.

Fig. 6 is a sectional view taken on the broken line 6—6 of Fig. 4.

Fig. 7 shows an initial step in assembling tapes with an arranged field of the elements.

Fig. 8 shows the resultant product, with the elements corresponding to the showing in Fig. 4.

Fig. 9 shows the succeeding step of producing the tape holding openings in a die, while securing the tapes to a multiplicity of decorative elements arranged in a field.

Fig. 10 is a plan schematic view showing the decorative elements retained in a field while the tapes are applied as in Fig. 7, but in an arrangement such that a handbag can be produced with a minimum of labor, by pulling up or tensioning certain of the tape loops.

Fig. 11 is a side view of a handbag produced according to the method shown in Fig. 10.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawings, therefore, are submitted merely as showing the preferred exemplification of the invention.

Referring in detail to the drawings, 15 denotes a decorative element embodying the invention. The same consists of plastic and forms a rigid device comprising a plane section 16 having a marginal flange 17 at right angles thereto. This flange is continuous except for certain interruptions incident to the tabs 18. A pair of these tabs are provided centrally at each side of the element, opposed pairs of tabs being in alinement with each other and being disposed at right angles to the central plane of the other tabs. The tabs of each pair are parallel to each other and are at right angles to the section 16. They project inward with respect to the flange 17 and extend substantially above the latter. They are formed integrally with the section 16 and with a portion of the flange 17, being separated from the flange by open ended slots or notches 19 which stop short of the section 16. Thus it is seen that the structure 15 is one which is adapted for gang molding in a simple die. The element 15 can be easily stripped from the die, being free of any undercut portions.

As shown in Figs. 4 to 6, there is a decorative element 20 embodying the invention, and produced from the element 15. Here the tabs 18 have been folded or bent toward each other to provide upright portions 21 and horizontally disposed portions 22, the edges of the latter being in contact with each other at 23. Due to the original spacing between the tabs 18, there results an opening 24 whose width is sufficient to freely receive a tape. Due to the height of the tabs 18, the portions 22 come together along the plane of the edge of the flange 17 or slightly below the same in Figs. 5 and 6, leaving an opening 24 which freely allows for the thickness of the tape. By reason of the notches 19, the portions 21 are adapted to curve as the forming pressure may require, without causing deformation or breakage of the flange 17 or distortion of the portions 21, 22. Since the tabs are partially connected to the flange 17 they reenforce the latter at the edges of the adjacent holes or interruptions of the flange, to thus avoid breakage especially as these holes are open to the free edge of the flange. When the portions 22 are pressed against each other at 23, there is a tendency for lateral flow of the softened plastic, so that a projection may occur beyond the edge of the element 20. Hence the edges of the portions 22 as well as of the tabs 18 are beveled or curved as at 25, whereby the portions may not protrude beyond the edge of the element 20 and prevent adjoining elements from lying in close edge to edge contact with each other. Since the notches 19 terminate in spaced relation to the plane section 16, they will not be noticeable when a wall of the elements 20 is constructed.

The essential utility of the devices 17 and 20 will be perceived on considering Figs. 7, 8 and 9. There is shown an arranged field 26 of elements 15, which is maintained by a die or form of a suitable shape according to the article to be produced, and into which the elements 15 may be rapidly inserted. Thereupon tapes 27 are placed in one direction to lie between the tabs 18 of all the elements, and then another set of like tapes 28 may be laid down in a similar manner in a direction at right angles to the tapes 27 and overlying the latter. Now all the tabs 18 may be simultaneously subjected to heat and pressure to bend them downward according to Fig. 4, whereupon there is produced an article 29 according to the invention. In this article 29 all of the tapes are slidably secured in the holes 24 formed by the portions 21, 22 which thus produce eyes 30 up to the very edges of the decorative elements 20, but without protruding so that the elements are adapted to lie in contact with each other. Thus the tapes retain the elements to prevent them from tilting and upraising their front edge and thus disturbing the uniformity of the finished surface provided by the wall sections 16.

Referring now more particularly to Fig. 9, there is shown a die 31 for the structures of Figs. 7 and 8. The same may include a platen 32 having a marginal lip or low flange 33, defining a field in which the elements 15 are set up, and the tapes 27, 28 applied all as shown in Fig. 7. Now, with the tapes thus freely applied and retained, a head 34 of the die is applied, having a heating means 35 which may include an electrical coil and thermostatic control means (not shown) whereby this head is maintained at a temperature just sufficient to soften the tabs 18 on an application thereto which may last only a small fraction of a minute. This head 34 may have a series of projections or heads 36 for the tabs of each individual element 15, each head 36 being suitably shaped to bend the tabs to produce the eyes 30. For instance, each head may have a cylindrically curved concave bottom surface 37 and parallel tapered lips 38 which may be so thin as to be adapted to enter the notches 19 if desired without disturbing the flange 17. Each head 37 may be smaller than the inside of the flange 17 and may be shaped like a cross with a recess 37 for each pair of tabs, there being such a recess in each arm of the cross. Thus the head may press the ears 30 to an elevation below that of the top edges of the flange 17 without distorting the latter. On the inner face of the head 34, a sheet of insulation 39 may be provided, extending around the heads 36, to prevent any possible softening of the flange 17. The application of heat and pressure is such that the tapes 27, 28 are not in any way damaged, and the plastic is not caused to adhere thereto. In fact, the plastic need not stick together at the meeting edges 23. Where the tapes may tend to twist, they may be secured to the base plate 33 as by any spring clips 40 or other releasable means. Because the lip 33 is so low, the tapes 27, 28 may freely extend from and beyond the die and hence may be applied in a series of loops back and forth as shown in Fig. 10. When the operation of Fig. 9 is completed, the structure may be removed and is like that of Fig. 8.

Referring now to Fig. 10, there is shown an arranged field of elements 15 according to the practice of Figs. 7 and 8, for producing a handbag in an improved manner. This field is generally rectangular to provide a section 42 providing one side wall, vertical rows of elements 43 to provide end walls, and sections 44, 45 which come together to provide the other side wall. Coincident with the section 42 there is a row of elements 46 to provide a bottom wall of the handbag. While the field of elements 41 is disposed in a platen 32 shaped to fit the sections 42, 43, 44, 45 and 46, the tapes are applied to lie between the tabs 18. Thus there are horizontal tapes 47. There is a tape, a part of which lies horizontally at 49 in bottom wall section 46 and vertically in the end wall sections 43. A tape 50 extends vertically along rows of elements in sections 42 and 45. Tapes 51, 52 each make almost two complete loops in sections 42 and 45. A tape 53 makes almost two complete loops through sections 42 and 44 and tape 54 makes three loops through these sections. All of the loops pass through the elements of the section 46. Where flat or strip-like tapes are used, twisting thereof may be prevented by clipping the same as at 40 in Fig. 9, where the tapes leave the elements. The advantage of the loop formations is that time is saved, since it is not necessary to handle many pieces of tape. Fabrication of the handbag is speeded up because there are relatively few tape ends to secure by knotting or tacking, which always afford the danger of accidental opening or loosening up. The handbag itself may now be produced by pulling up on the loops progressively along the different tapes until virtually all slack is eliminated. In this connection, the importance of the easy slidability of the tapes in the eyes 30 will be apparent. The handbag produced will now be described.

In Fig. 11 is shown a handbag 60 embodying the invention. Upon suitably pulling up the various tapes as above described the handbag 60 is formed having identical side walls 61 one of which is produced by section 42, and the other of which by sections 44, 45 which meet together; end walls 62 formed by the respective sections 43, and a bottom wall 63 formed by the section 46. Thus the handbag is of generally rectangular shape. The horizontal tapes 47 are knotted together at their ends as at 64, and the free ends of the tapes 49, 51, 52, 53, and 54 are secured by tacking or stitching to a lining which may be dropped into the bag or to strip elements 66 at the mouth of the bag, or in any other suitable manner, as illustratively indicated at 65. It is noted that there are no knots or other securing points such as 64, 65 at the bottom of the bag, where the immediate strain is greatest. Any suitable closure, such as a slide fastener (not shown) may be provided at the mouth of the handbag.

In the handbag 60, the outer surfaces for the walls 61, 62 and 63 are afforded by the flat sections 16 of the decorative elements 20, these sections 16 being suitably ornamented by molded designs (not shown). The interiors of the decorative elements face inward and are not shown, and likewise the flanges 17 thereof are concealed except at the edges of the handbag. The elements lie closely together in contact with each other whereby the notches 19 and the tapes are likewise concealed, being seen only at the edges of the handbag. There small portions of the tapes are exposed because the adjoining elements 20 lie at right angles to each other. These portions lie close in, as they are under tension. In all other respects, the tapes are fully concealed. The bag possesses ample flexibility because there is always some yield in the tapes and because the flanges 17 are small in depth so that angular movement between the elements can occur to promote flexibility. Nevertheless, the wall will not "break" in such a manner as to permit one edge of an element to protrude outwardly beyond an edge of an adjoining element, since the tapes hold the elements together at their very edges, because the eyes 30 extend to the edges of the elements.

It will now be seen that the invention comprises new structures in laced decorative elements as well as in the elements themselves and in the handbags provided therefrom, as well as new methods for producing certain of these structures. The essential feature of the new methods is that the plastic elements are molded to provide projecting tabs affording alined openings in different elements, these being arranged in rows and columns according to the design or structure of the article to be produced, whereupon tapes or laces are placed in said openings along the rows and columns, and finally heat and pressure are applied simultaneously to all the tabs, above the tapes, to soften and bend the tabs to provide closed eyes for slidingly holding the tapes whereby the elements are thus interconnected to produce a wall without the laborious stringing heretofore practiced. It will be noted that these ears may remain split for flexibility in the elements themselves or may form autogenous joints between the tabs reenforcing the element at the interrupted flange. The process described lends itself readily to a further novel process whereby the tapes are laid down in loops, so that a handbag, for example, can be constructed by lacing continuously interconnecting vertical columns of elements in opposite side walls while other lacing continuously interconnects horizontal rows of elements in opposite side walls, with certain of this lacing also connecting elements in the bottom wall and in end walls.

I claim:

1. The herein described process, including molding a plastic decorative element having a marginal flange having alined holes open at the edges of the flange and having tabs adjacent to said holes, placing a tape or cord member in said alined holes so that it lies adjacent to the tabs, then applying heat and pressure only to the tabs to soften and bend the same over the member without otherwise affecting the latter, to thus secure the element to the member.

2. A handbag having a wall having a series of laced plastic decorative elements, each element having a front wall and a marginal flange, the flange having alined holes open at the edge of the flange for receiving the lacing, pairs of opposed tabs integral with the front wall and being disposed adjacent to the holes, each tab being partially connected to the flange at an edge of a hole for reenforcing the flange, lacing in the holes, and the tabs of each pair having angular portions extending toward each other to form an eye for the lacing to thus mount the element thereon.

MAX H. STORCH.